(No Model.) 3 Sheets—Sheet 1.
D. A. FOSTER.
VEHICLE RUNNING GEAR.

No. 518,809. Patented Apr. 24, 1894.

Witnesses:
W. L. Bushong.
L. A. Minturn

Inventor,
David A. Foster,
By Joseph A. Minturn
Attorney.

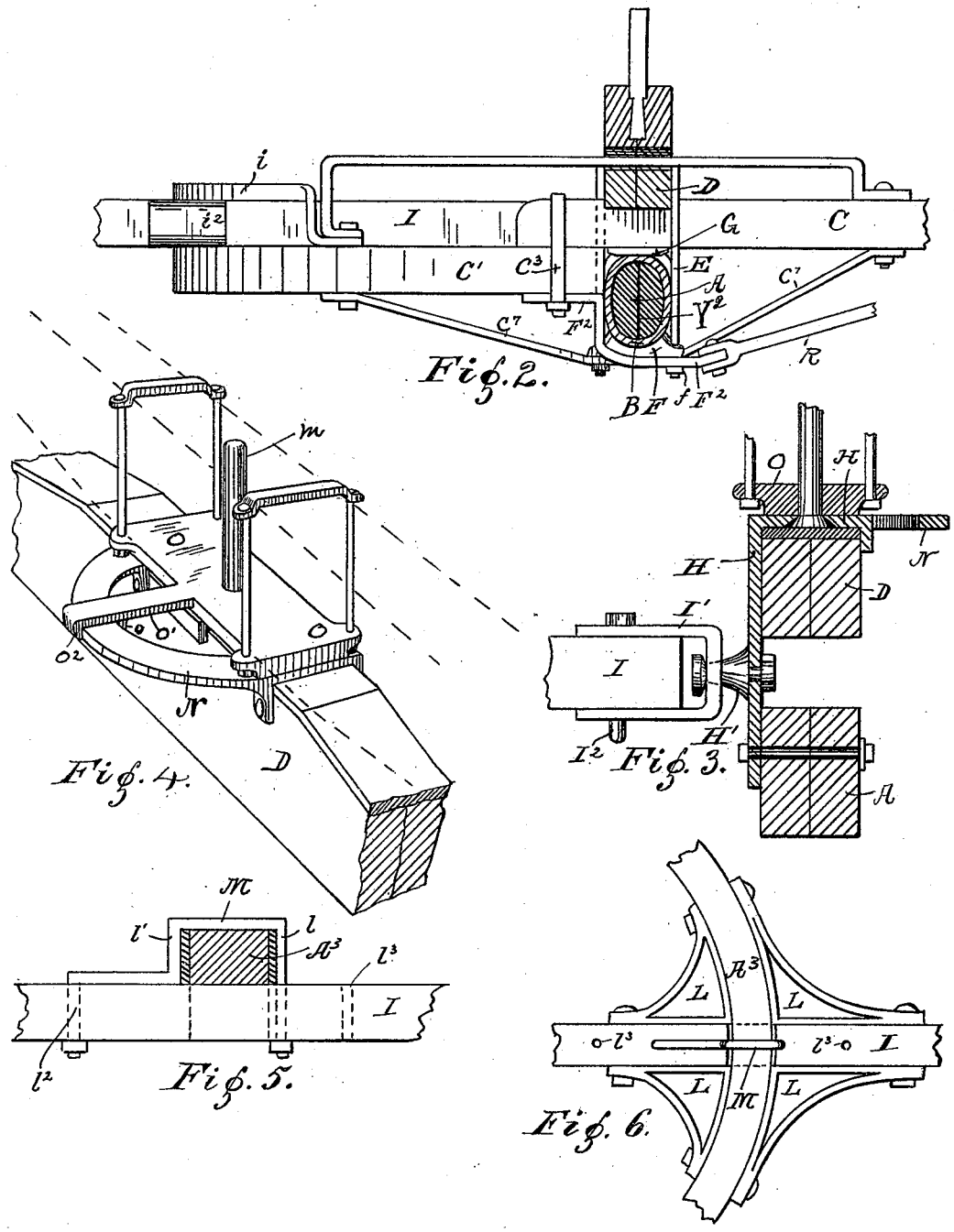

(No Model.) 3 Sheets—Sheet 3.
D. A. FOSTER.
VEHICLE RUNNING GEAR.

No. 518,809. Patented Apr. 24, 1894.

Witnesses:
Wm Hafer,
Leona A. Minturn

Inventor
David A. Foster,
By Joseph A. Minturn
Attorney

United States Patent Office.

DAVID A. FOSTER, OF INDIANAPOLIS, INDIANA.

VEHICLE RUNNING-GEAR.

SPECIFICATION forming part of Letters Patent No. 518,809, dated April 24, 1894.

Application filed May 5, 1893. Serial No. 473,138. (No model.)

*To all whom it may concern:*

Be it known that I, DAVID A. FOSTER, a citizen of the United States, residing at Indianapolis, in the county of Marion and State of Indiana, have invented certain new and useful Improvements in Vehicles; and I do hereby declare the following to be a full, clear, and exact description of the invention, such as will enable others skilled in the art to which it appertains to make and use the same.

This invention relates to improvements in vehicles, and the objects of the invention are first to provide means by which the pull will be directly from the axle instead of from the hounds or tongue as heretofore and to so combine and arrange the several parts that the pull of each horse will be exerted on its respective end of the axle close to the inside of the front wheels; second to provide a construction for the attachment of the horses that will allow the latter to be hitched close to the axle without interfering with the front wheels; third to provide means for clipping the sand bar and hounds to the axle in a secure and substantial manner without perforating and thereby weakening the several parts with bolt holes; fourth to secure the reach to the front axle in a manner independent of the bolster pin and to provide a swivel connection that will also allow a rotary movement of the reach without danger of splitting; fifth to improve the entire construction of the running gear so as to make a stronger and more durable vehicle and to cheapen the cost of manufacture.

I accomplish the objects of this invention by the mechanism illustrated in the accompanying drawings in which—

Figure 1:
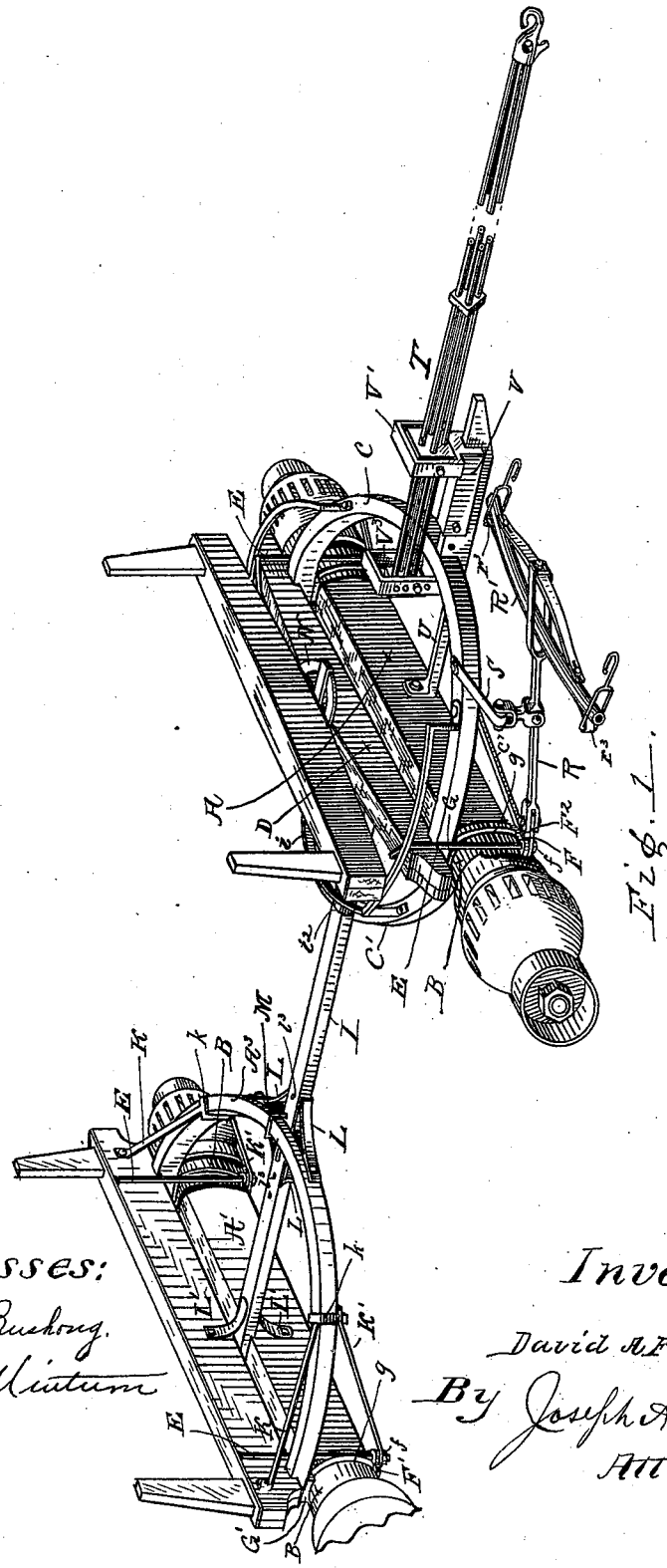
Figure 7:
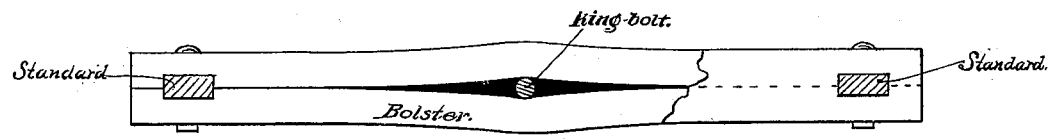
Figure 8:
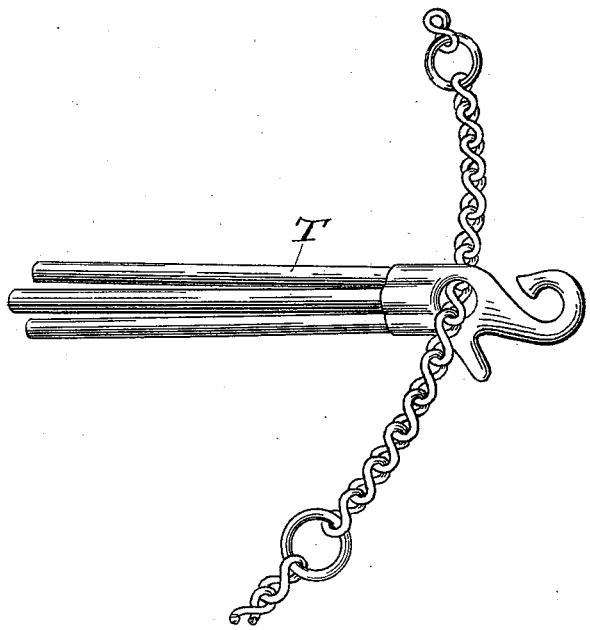

Figure 1 Sheet 1 is a view in perspective of a vehicle gear constructed in accordance with my invention. In this view the spokes and fellies of the wheels are not shown and both front and rear hubs on the near side of the drawings are partially broken away and only the near whiffle tree is shown. The tongue is also broken through and shortened up to economize space in the drawings. Fig. 2 is a detail in side elevation partially in section of the front part of the gear showing the manner in which the hounds are ironed and clipped to the axle and sand bar and also shows the two-part construction of the bolster sand bar and axle. Fig. 3 is a detail in cross section of the axle and sand bar and shows the method of connecting the reach and also the attachment of the bolster pin. Fig. 4, is a detail in perspective of the central portion of the sand bar, and shows the irons by which the bolster is secured to the bar and by which the bolster pin is relieved of much of the strain upon it. The position of the bolster is indicated by the dotted lines. Fig. 5 is a detail in side elevation of the reach and shows the connection between the reach and the rear hound and Fig. 6 is a top or plan view of same. Fig. 7 is a top or plan view of the front bolster showing the metallic covering plate removed in part to show the bolster as constructed in two sections and shows the manner in which the sections are spread apart to receive the king-bolt without cutting away the material of the bolster. Fig. 8 is a detail in perspective of the front end of the tongue and shows the construction and method of attachment of the tongue chain.

Similar letters refer to like parts throughout the several views of the drawings.

A is the front and A' is the rear axle each of which will preferably be constructed of two longitudinal pieces as shown in section in Figs. 2 and 3. These will be held together at the ends by the metallic skeins B of usual construction and will be capped with a metal plate $a$ to keep moisture from penetrating the joint between the two pieces.

The reason a two part axle is more desirable than a solid one is because the increasing scarcity of good wagon timber makes it almost impossible to secure a desirable solid axle at a reasonable price and by making the axle in two parts enables me to secure a more uniformly good axle at a much less cost than if solid. For the same reason I will prefer to construct the sand bar and the bolsters of my vehicle from two pieces and in the formation of the front bolster this two part construction will give me an additional advantage in providing for the opening for the bolster pin as will be more fully described hereinafter.

C is the front circle bar or hound to which the tongue is attached. It is constructed of hickory or other strong and durable wood bent into a semi-circle and having the two ends impinged between the axle and the sand bar as clearly shown in the drawings. The ends of the hound are allowed to project a suitable distance to the rear of the axle to give engagement to the hound on the back side of the axle as will be hereinafter described.

D is the sand bar constructed of two pieces as described for the axle, but in all other respects similar in shape to the sand bars on other wagons. The ends of the sand bar rest upon the ends of the hound C and both sand bar and hound are firmly secured to the axle by means of the clip E. The clip E is shaped like an inverted U and is placed with one of the stems of the U on the outside of the hound in front of the axle and the other stem of the U on the inner side of the hound and to the rear of the axle. The ends of the U are projected through a metal plate F and are secured by nuts $f$ which screw onto the threaded ends of the U shaped iron.

G is a metal plate which is interposed between the top of the skein and the hound C and both the plates G and F are grooved to receive the bead $g$ on the circumference of the skein, and serves to hold the plates and the U shaped iron from displacement laterally along the axle.

C' is the hound to the rear of the front axle and is of wood bent in a semi-circle as described for the hound C. The forward ends underlap the rearwardly projected ends of the piece C, and are secured by the clips $C^3$ which encircle both of the ends as is shown in Fig. 2.

$C^7$ is a brace one end of which is bolted to the under side of the hound C' and the opposite end to the under side of the hound C. The brace contacts with the under side of the plate F and along the inner edge of the plate. The inner stem of the clip E is projected through the brace iron and serves to hold it in place.

$F^2$ is a metallic strap, one end of which is secured by means of the clip $C^3$ to the under side of the hound C'. The strap is bent downwardly at right angles and follows close against the axle and thence forward against the under side of the plate F near its outer edge and is secured by the outer stem of the U which passes through it. The forward end of the strap is continued beyond the stem of the clip E and forms the attachment for the whiffletree.

H, Fig. 3, is an angle bar bolted to the back sides of the axle and sand bar, and extending across the top of the sand bar and for still greater stength and permanency, may be bent down and over the upper front corner of the sand bar as shown in the drawings. This bar H is placed centrally between the ends of the axle and serves for the attachment of the reach.

H' is a stud pin bolted to the bar H and is extended to the rear into engagement with the clevis I' on the end of the reach I, forming a swivel connection with the clevis that will allow a rotary movement of the reach around the stud pin.

$I^2$ is the pin by which the clevis is secured to the reach and forms the pivot about which the reach has its horizontal movement.

The reach I, lies on top of the hound C' and is held close against the hound by the spring $i$. The spring $i$ will "give" sufficiently to allow free movement of the reach without danger of splitting when the vehicle is subjected to a twisting strain which frequently occurs in passing over obstructions and uneven surfaces. At the point of contact between the reach and the spring $i$, and hound C', the reach will be bound with metal to prevent undue wear. This is shown at $i^2$.

$A^3$ is the rear hound and is constructed of timber bent into a semicircle and having the ends fastened to the rear axle by clips in the manner as described for the attachment of the hounds in front, except that the rear bolster is the superimposed piece between which and the axle the ends of the hounds are impinged. Grooved metal plates F' and G' below and above the skein and identical in construction and use with the plates F and G, as used on the front axle, are employed.

K are braces running from the bolster to the hound. The bolster end is secured by the same bolt that fastens the standard, and the lower end is secured by a clip $k$. K' is a similar brace running from the axle to the hound. The lower end of the brace K' is secured by the clip that holds the bolster hound and axle together and the upper end is held by the clip $k$. A central notch is formed in the hound $A^3$ for the passage of the reach, and the four angle irons L are used as stays to guide, support, and strengthen the reach at its junction with the hound. Heretofore a slide through which the reach would be projected, and presenting a broad upper surface, has been used, and is objectionable, especially in dumping wagons, because of the sand, dirt, or other contents that would be deposited thereon, to be scattered over the pavement or roadway by the after jolting movement of the wagon. To remedy this I construct open corner pieces between the reach and hound which allows the foreign matter to pass through.

L' are springs bearing against the reach above and below to prevent the wear of the latter against the bolster and axle.

M is the coupling pin by which the reach is secured to the rear hound and by the peculiar shape, three bearings, $l$, $l'$ and $l^2$ are secured, and a stronger and more durable connection obtained. Suitable holes $l^3$ through the reach allow for various adjustments of the hound upon the reach.

N is a segmental metallic plate secured to the top of the sand bar so as to make the segment concentric with the bolster pin. The bolster pin $m$ is projected through an opening in the plate or bar H on top of the sand bar. A head larger than the opening, holds the pin from displacement and by countersinking the opening from the under side to give a sufficient freedom of movement of the head of the pin in its socket in the plate H, the usual wear of the bolster pin in its socket will be prevented.

O is a bearing plate which is clipped to the under side of the front bolster and through which the bolster pin is projected as shown in Fig. 4. It rests upon the plate N and is provided with a forwardly projected arm O' integral with the plate O. Projected down from this arm O' are the lugs $o$ and $o^2$ so arranged as to bear against each edge of the segment N. The purpose of these lugs is to take the strain as much as is possible off of the bolster pin.

The method of operation is readily understood from the drawings.

In the construction of a bolster from two longitudinal timbers, I am enabled to spread the timbers at the middle to make room for the bolster pin without cutting away the material or weakening it in any way, and also in fastening in the standards I am enabled to form an upwardly tapering dovetail on the inserted end of the standard, and insert the standard end by spreading the two parts, after which they will be bolted together.

In my vehicle the double tree for two horses as commonly employed, will be dispensed with and the connection of the single trees made with the axle direct, as is shown in Fig. 1. In this construction I employ the bar R which is connected pivotally with the front end of the brace $F^2$, and the outer end of the bar is provided with a longitudinal slot within which the single tree is secured so the pulling strain will be against the outer end of the slot. The bar will be supported by a spring S, reaching out from the front hound C. The single tree R' will preferably be made from gas pipe and will be curved so as to allow of its use close up to the axle without its interfering with the front wheels of the wagon. The single tree will be provided on its concave side, with a semi-elliptic spring which will be secured to the single tree by means of stud pins fixed therein and working in longitudinal slots in the ends of the spring and allowing for the expansion and contraction of the spring longitudinally. The spring will be riveted or otherwise secured to the front of the slotted end of the bar R. The hooks for receiving the trace chains will be secured to the ends of springs $r^3$, and the opposite ends of the springs will be bolted or riveted to the single tree. The object in introducing these springs is to provide means for breaking the suddenness of the pulling strain on the horses in starting the load.

T is the tongue which I shall use in the construction of my improved wagon in connection with the peculiar shape of front hounds which I employ. The tongue will be made of longitudinal pipes (gas pipes) trussed together and converging in a metal point having a hook at the end for additional attachment of teams and also an under lug or hook to act as a stop for the neck yoke. The end piece will also be provided with a circular opening through which the tongue chain will be projected. The tongue chain will be similar to others now in use with the exception that a foot or more of the chain will be provided, to pass freely through the opening and having a ring at each end of this length larger in diameter than the hole to act as a stop. A certain play within prescribed limits is thus given to the tongue chain and much of the jerking movement on the necks of the horses removed.

U is a bar bolted to the axle by the same bolt that fastens the bar H. The bar U is projected forward to the front hound C and is secured to it. It is also continued in front of the hound C a considerable distance to form a track for the slide V.

V' is a yoke integral with the slide and through which the tongue of the wagon is projected and locked by means of a transverse pin through the yoke and contacting with one of the braces in the tongue as shown in Fig. 1. The slide V is secured to the bar U by a cross pin. A series of holes in the track piece enables the tongue to be shortened up or lengthened.

$V^3$ is a yoke secured to the bar U between the hound and the axle and extended enough to allow of considerable vertical adjustment of the end of the tongue which will be located therein. A transverse pin passing through the openings between the tubes of the tongue, or other openings, holds the tongue at the desired angle and this may be varied by changing the pin to other holes of the series which will be provided through the yoke for that purpose.

By the construction as above described a clear space is provided in front of the front axle so as not to gather dirt in dumping the load.

I claim—

1. In a vehicle, the combination with the axle and the sand bar, bolster, or other superimposed piece, of a curved hound having its ends impinged between the axle and the said superimposed piece, and a clip to bind the several parts together and so arranged that the vertical stems of the clip are on opposite sides of the hound.

2. In a wagon gear a front axle, a semicircular hound secured at its ends to the axle and projected forward to support the tongue of the wagon and by the shape of the hound providing an open space between the hound and the axle, and whiffle trees connected with the axle so as to dispense with the double tree and together with the open hound forming an open construction in front of the axle such as will allow of the unobstructed fall of the contents of the wagon bed in the operation of dumping.

3. In a vehicle a tongue constructed of tubular sections, brace plates to spread the tubes apart and also to bind them together and forming a trussed construction of the tubes, yokes secured to the axle or front hound of the gear and adapted to receive the rear end of the trussed tongue, and pins projected through suitable openings in the frame of the yokes and through the spaces between the tubular sections of the tongue and serving to give an adjustable attachment of the tongue to the vehicle gear substantially as described.

4. A bolster constructed of two equal longitudinal sections which will be spread apart at their middles to admit the bolster pin without cutting away the material of the bolster, in combination with said bolster pin and with standards, said standards being dovetailed into the ends of the bolster and inserted by spreading the ends of the two part bolster sufficiently to admit the standard, and bolts to hold the several parts together, substantially as described and specified.

5. In a vehicle gear an angle plate or bar overlapping the top of the sand bar and connecting the sand bar with the axle and forming a place of attachment for the reach, a stud pin secured to the angle bar and engaging a clevis on the end of the reach and forming a swivel joint therewith, a clevis pivotally secured to the reach, and a reach connecting the rear with the front axle.

6. In a vehicle, a segmental plate secured to the sand bar and projected forward concentrically with the bolster pin, and a superimposed plate secured to the under side of the bolster and having a forwardly projected arm integral with the superimposed plate; the said arm having two downwardly projected lugs to bear against the front and back edges of the segmental plate and take the strain of the load off of the bolster pin, substantially as described.

7. The combination with a semi-circular or bent hound and a reach, of a coupling pin projected through the reach in front of the hound and then bent to conform to the shape of the front, top, and back sides of the hound, and thence projected in close contact with the upper face of the reach, for a suitable distance to the rear of the hound and thence bent down and projected through the reach in the manner substantially as shown and for the purposes specified.

8. The combination in a vehicle of an axle, a thimble skein, a sand bar or bolster, a curved hound, and a clip to hold these several parts together, with a metallic plate interposed between the wagon skein and the hound and also a plate under the skein to lock the depending ends of the clip together, both of said plates being provided with grooves to fit over the bead on the skein and by so doing to prevent the longitudinal movement of the clip on the axle.

9. The combination with an axle, a curved hound and a brace bar secured at one end to the hound and thence passing around in close contact with the axle and terminating in front of the axle in an eye for the attachment of the single tree, of a bar secured to the eye and having a longitudinal slot in its outer opposite end, to receive the single tree which will be secured therein, and a curved tubular single tree having a semi elliptic spring interposed between it and the point of attachment with the slotted bar, and spring connected trace hooks secured to the ends of the single tree all substantially as described and for the purposes specified.

In testimony whereof I affix my signature in presence of two witnesses.

DAVID A. FOSTER.

Witnesses:
JOSEPH A. MINTURN,
W. L. BUSHRUG.